US012717575B2

(12) United States Patent
Arakelian et al.

(10) Patent No.: US 12,717,575 B2
(45) Date of Patent: Aug. 25, 2026

(54) MANAGEMENT OF SOFTWARE TESTING CHECKERS USING EVENT DISPATCHER

(71) Applicant: Dell Products L.P., Round Rock, TX (US)

(72) Inventors: M. Adam Arakelian, Shirley, MA (US); Karl M. Owen, Chapel Hill, NC (US); Robert A. Ballantyne, Mansfield, MA (US); Robert J. Bell, IV, Forest City, NC (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/345,114

(22) Filed: Jun. 30, 2023

(65) Prior Publication Data

US 2025/0004755 A1 Jan. 2, 2025

(51) Int. Cl.
*G06F 8/71* (2018.01)
*G06F 11/3698* (2025.01)

(52) U.S. Cl.
CPC ............ *G06F 8/71* (2013.01); *G06F 11/3698* (2025.01)

(58) Field of Classification Search
CPC ..... G06F 8/71; G06F 11/3698; G06F 11/3688
See application file for complete search history.

(56) References Cited

U.S. PATENT DOCUMENTS 6,901,594 B1 * 5/2005 Cain ...................... G06F 9/542 709/227
2005/0081192 A1 * 4/2005 DeLine ............... G06F 11/3604 717/126
2011/0087767 A1 * 4/2011 Sonkin ................ G06F 9/44505 709/224
2015/0242081 A1 * 8/2015 Kobzda .................. G06F 9/542 715/767
2016/0350173 A1 * 12/2016 Ahad ...................... H04L 67/02
2020/0145816 A1 * 5/2020 Morin ................ H04L 63/1433

(Continued)

OTHER PUBLICATIONS

U.S. Appl. No. 17/544,387 entitled "Distributing Event Messages from a First Service to Additional Services Using a Message Store"; filed Dec. 7, 2021.

(Continued)

*Primary Examiner* — Wei Y Mui
*Assistant Examiner* — Travis Viet Tran
(74) *Attorney, Agent, or Firm* — Ryan, Mason & Lewis, LLP

(57) ABSTRACT

Techniques are provided for management of software testing checkers using an event dispatcher. One method comprises obtaining, by an event dispatcher, a configuration of software testing checkers for evaluating software; in response to a notification of a designated event associated with the software: posting, by the event dispatcher, the designated event to a topic on a message queue using the configuration, wherein at least one software testing checker monitors the topics on the message queue and processes the designated event from the message queue, and wherein the at least one software testing checker: (i) posts one or more output messages, related to the software, to one or more of the topics on the message queue and/or (ii) sends a status result, related to the software, to an external service. The configuration may be specified for a particular software branch and/or repository associated with the software.

20 Claims, 8 Drawing Sheets

(56) References Cited

U.S. PATENT DOCUMENTS

| | | | | |
|---|---|---|---|---|
| 2020/0241942 | A1* | 7/2020 | Crouse | G06F 9/546 |
| 2020/0379880 | A1* | 12/2020 | Rodrigues Rosa Junior | G06F 11/3616 |
| 2021/0182182 | A1* | 6/2021 | Felisatti | G06F 11/3688 |
| 2021/0255917 | A1* | 8/2021 | Reitbauer | G06F 11/3409 |
| 2022/0147438 | A1* | 5/2022 | Gadagi | G06F 11/3692 |
| 2022/0318129 | A1* | 10/2022 | Yosef | G06F 11/3676 |
| 2023/0179559 | A1* | 6/2023 | Ballantyne | H04L 67/55<br>709/206 |
| 2024/0354102 | A1* | 10/2024 | Hemadri | G06F 8/71 |

OTHER PUBLICATIONS

"Publisher-Subscriber Pattern"; https://learn.microsoft.com/en-us/azure/architecture/patterns/publisher-subscriber; downloaded on Jun. 27, 2023.

"Documentation—Kafka 2.0 Documentation"; https://kafka.apache.org/20/documentation.html; downloaded on Jun. 27, 2023.

* cited by examiner

MANAGEMENT OF SOFTWARE TESTING CHECKERS USING EVENT DISPATCHER

BACKGROUND

A number of techniques exist for developing and evaluating software code. Software development platforms are available, for example, that enable communication and collaboration among software developers. It is often difficult for software developers or other information technology professionals to apply software testing checkers to evaluate software code.

SUMMARY

Illustrative embodiments of the disclosure provide techniques for management of software testing checkers using an event dispatcher. In one embodiment, a method comprises obtaining, by an event dispatcher, a configuration of a set of software testing checkers for evaluating software, wherein the set of software testing checkers comprises a plurality of software testing checker types; in response to a notification of one or more designated events associated with the software: posting, by the event dispatcher, the one or more designated events to one or more topics on a message queue using the configuration, wherein at least one of the software testing checkers in the set monitors one or more of the topics on the message queue and processes one or more of the designated events from the message queue, and wherein the at least one software testing checker one or more of: (i) posts one or more output messages, related to the software, to one or more of the topics on the message queue and (ii) sends a status result, related to the software, to an external service.

In some embodiments, the event dispatcher receives one or more configuration messages and updates the configuration based at least in part on a content of the one or more configuration messages. The configuration may be specified for at least one of: one or more branches of the software and one or more repositories associated with the software. The configuration of the set of software testing checkers for evaluating the software may be specified, for example, by selecting from a listing of designated software testing checkers. The one or more designated events associated with the software may comprise events related to one or more of a software build request, a software pull request and a software deployment request.

In one or more embodiments, the software comprises a plurality of software delivery types. The plurality of software delivery types may comprise two or more of on-premises software, off-premises software and embedded software within one or more hardware devices. A same configuration of the set of software testing checkers for evaluating the software may be specified for the plurality of software delivery types.

Illustrative embodiments can provide significant advantages relative to conventional techniques. For example, technical problems associated with managing software testing checkers are mitigated in one or more embodiments by employing an event dispatcher to perform event-based software testing checker management.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for management of software testing checkers using an event dispatcher.

In one or more embodiments, techniques are provided for event-based software testing checker management. An event dispatcher, in one or more embodiments, processes (i) configuration messages, for example, following a user selection of software testing checkers to maintain a mapping of incoming event information to relevant topics on a message queue, and (ii) event messages generated by event sources that are posted by the event dispatcher to topics on the message queue, based on the mapping, and are consumed from the message queue by one or more interested software testing checkers.

Figure 1:
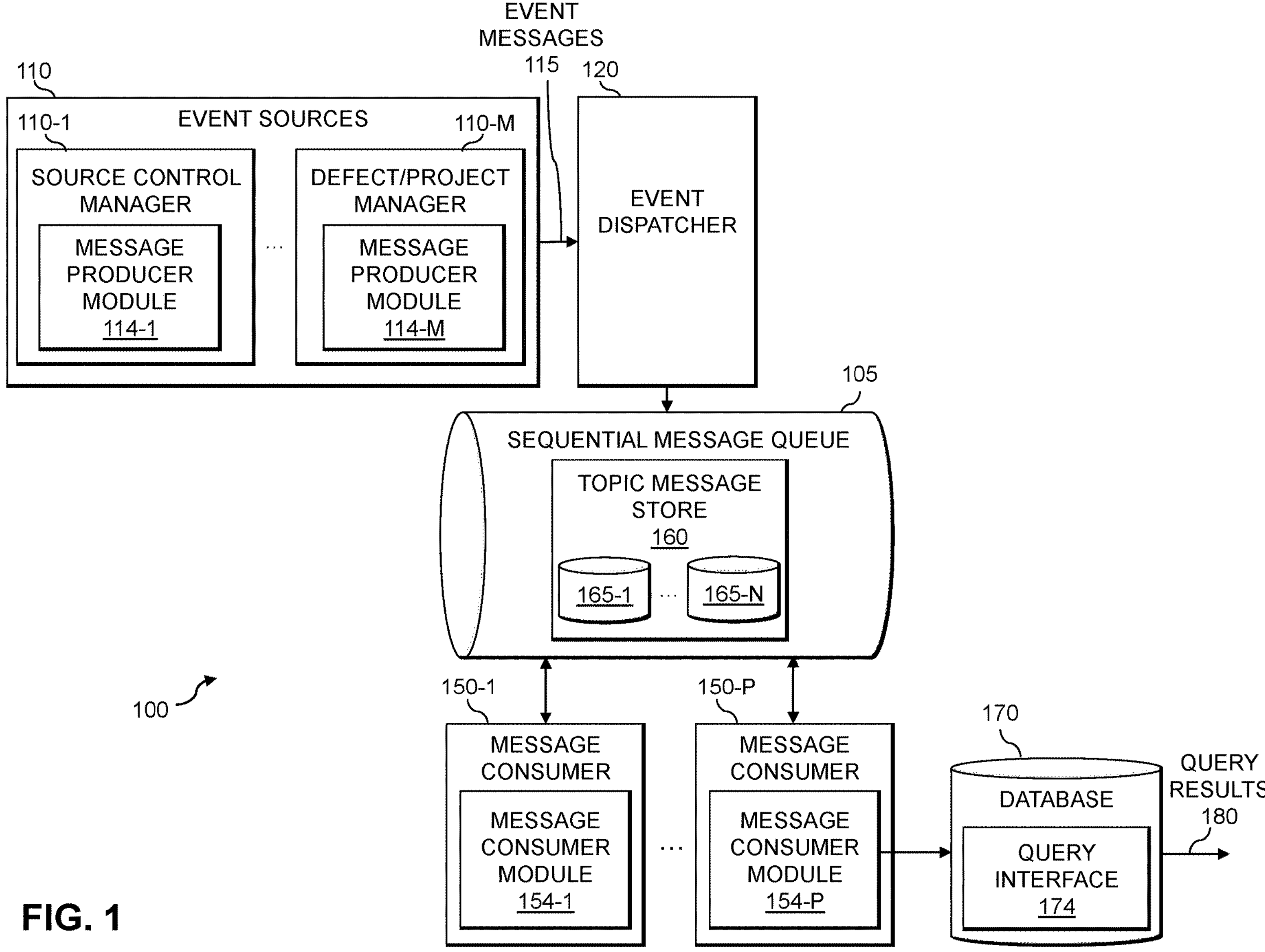
FIG. 1 illustrates an information processing system configured for management of software testing checkers using an event dispatcher in an illustrative embodiment.

FIG. 1 shows an information processing system 100 configured in accordance with an illustrative embodiment. The exemplary information processing system 100 comprises one or more event sources 110 (e.g., executing on one or more host devices), an event dispatcher 120 and one or more message consumers 150-1 through 150-P (e.g., executing on one or more host devices), collectively referred to herein as message consumers 150. The information processing system 100 further comprises a sequential message queue 105 and a database 170, discussed below.

In the example of FIG. 1, the event sources 110 provide one or more event messages 115 to the event dispatcher 120 (for example, using an application webhook interface) in response to an occurrence of corresponding events associated with the event sources 110, as discussed further below. In at least some embodiments, the event dispatcher 120 may be illustratively implemented as at least a portion of at least one computer, server or other processing device, and may perform acts such as those described in conjunction with FIGS. 4 and/or 6, for example. The one or more event sources 110 may be implemented on at least one processing device as any service or application that sends event-based messages to another service or application. In the FIG. 1 example, the one or more event sources 110 may comprise, for example, a source control manager 110-1 and a defect/project manager 110-M. The source control manager 110-1 and the defect/project manager 110-M may further comprise respective message producer modules 114-1 and 114-M.

The event sources 110 may be configured, in at least some embodiments, to send as much information as possible for as many events as possible to the event dispatcher 120. The event dispatcher 120 provides the messages to a sequential message queue 105, such as an enterprise service bus (ESB), where each message is published on the sequential message queue 105. One or more of the message consumers 150 consume one or more of the published messages on the sequential message queue 105. In the example of FIG. 1, the message consumers 150-1 through 150-P comprise respective message consumer modules 154-1 through 154-P that consume one or more of the published messages from the sequential message queue 105.

The sequential message queue 105 may be implemented, for example, as an ESB, a distributed event streaming platform, a distributed messaging system or using message-oriented middleware. An ESB is a software platform used to distribute work among connected components of an application. The ESB is designed to provide a uniform means of moving work, offering applications the ability to connect to the ESB and to subscribe to messages.

In some embodiments, the sequential message queue 105 supports publishing (e.g., writing) streams of events and subscribing to (e.g., reading) the published streams of events. The sequential message queue 105 may also store the streams of events durably and reliably. A message storage service (not shown in FIG. 1) associated with the sequential message queue 105 (e.g., a broker when the sequential message queue 105 is implemented as a distributed event streaming platform or a bookkeeper when the sequential message queue 105 is implemented as a distributed messaging system) may publish the published event message to zero or more topics 165-1 through 165-N associated with the sequential message queue 105, collectively referred to herein as topics 165, as part of a topic message store 160. The event messages are published to the topics 165 in accordance with a configuration, as discussed further below in conjunction with FIG. 4.

The topic message store 160 in the present embodiment may be implemented using one or more storage systems associated with the sequential message queue 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

In addition, the message storage service associated with the sequential message queue 105 may also notify one or more of the message consumers 150 of the availability of new published event messages on the sequential message queue 105. In some embodiments, the message storage service will notify those message consumers 150 that subscribed to any of the topics 165 where the new published event message was published. In a further variation, the message consumers 150 can look for new messages on the sequential message queue 105.

In addition, one or more of the message consumers 150, such as message consumer 150-P in the example of FIG. 1, may place a new event message in a database 170. In the example of FIG. 1, the database 170 comprises a query interface 174 that allows the event messages in the database 170 to be queried, for example, using SQL (Structured Query Language) queries, and to provide query results 180. In this manner, the event messages may be accessed by (and made available to) database-centric consumers. Thus, the database 170 provides longer term storage, a means to aggregate the data, and a means to query the data for reporting purposes using, for example, SQL.

One or more of the sequential message queue 105, event sources 110, event dispatcher 120, message consumers 150 and database 170 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

It is to be appreciated that the term "user" is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the sequential message queue 105, event sources 110, event dispatcher 120, message consumers 150 and database 170 illustratively comprise (or employ) processing devices of one or more processing platforms. For example, the event sources 110 may execute on one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the sequential message queue 105, event sources 110, event dispatcher 120, message consumers 150 and database 170 can additionally or alternatively be part of cloud infrastructure.

It is to be appreciated that this particular arrangement of elements 114 and 154 illustrated in the information processing system 100 of the FIG. 1 embodiment is presented by way of example only, and alternative arrangements can be used in other embodiments. For example, the functionality associated with elements 114 and 154 in other embodiments can be combined into a single element or a single module, or separated across a larger number of elements or modules. As another example, multiple distinct processors and/or memory elements can be used to implement different ones of elements 114 and 154 or portions thereof. At least portions of elements 114 and 154 may be implemented at least in part in the form of software that is stored in memory and executed by a processor.

The exemplary event dispatcher 120, for example, may include one or more additional modules and other components typically found in conventional implementations of an event dispatcher 120, although such additional modules and other components are omitted from the figure for clarity and simplicity of illustration.

In the FIG. 1 embodiment, the exemplary event dispatcher 120 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of one or more of the event sources 110, event dispatcher 120 and/or message consumers 150 to reside in different data centers. Numerous other distributed implementations of the components of the information processing system 100 are possible.

As noted above, the exemplary message consumer 150-P can have an associated database 170 where the message consumer 150-P can store the messages that are published to the sequential message queue 105. Although the published messages are stored in the example of FIG. 1 in a single database 170, in other embodiments, an additional or alternative instance of the database 170, or portions thereof, may be incorporated into the message consumer 150-P or other portions of the system 100.

The database 170 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the event sources 110, event dispatcher 120, and/or message consumers 150 can be one or more input/output devices (not shown), which illustratively comprise keyboards, displays or other types of input/output devices in any combination. Such input/output devices can be used, for example, to support one or more user interfaces to one or more components of the information processing system 100, as well as to support communication between the components of the information processing system 100 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for event-based software testing checker management is presented by way of illustrative example only, and in other embodiments additional or alternative elements may be used. Thus, another embodiment includes additional or alternative systems, devices and other network entities, as well as different arrangements of modules and other components.

Generally, an event records the fact that something has happened, typically with respect to an operation of one of the event sources 110. When the sequential message queue 105 is implemented, for example, as a distributed event streaming platform, data is read and written in the form of events. An event typically has a key, a value, a timestamp, and optional metadata. Producers are those services or applications that publish (e.g., write) events to the sequential message queue 105, and consumers are those services or applications that subscribe to (e.g., read and process) such published events from the sequential message queue 105.

Figure 2:
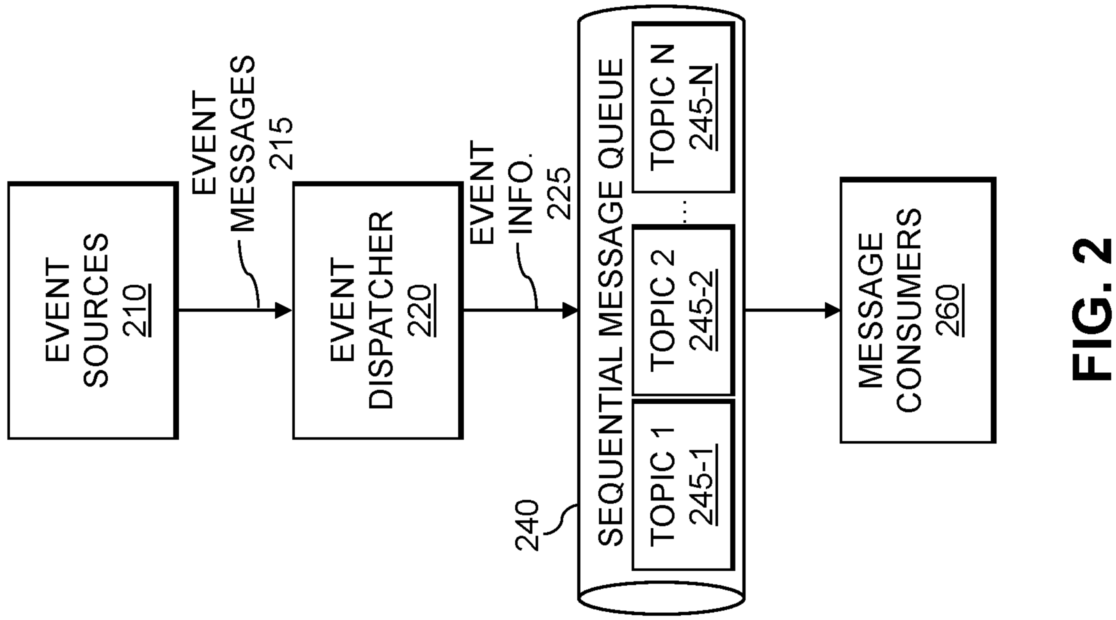
FIG. 2 illustrates a posting of event information to one or more topics on a sequential message queue in an illustrative embodiment.

FIG. 2 illustrates a posting of event information to one or more topics on a sequential message queue in an illustrative embodiment. In the example of FIG. 2, one or more event sources 210 (e.g., executing on one or more host devices) provide one or more event messages 215 to an event dispatcher 220 (for example, using an application webhook interface) in response to an occurrence of corresponding events associated with the event sources 210. The event dispatcher 220 may publish the event information 225 from one or more of the event messages 215 to one or more topics 245-1 through 245-N, collectively referred to herein as topics 245, associated with a sequential message queue 240. The event messages are published to the topics 245 in accordance with a configuration, as discussed further below in conjunction with FIG. 4. For example, the event dispatcher 220 may provide the event information 225 to the sequential message queue 240, such as the sequential message queue 105 of FIG. 1, where the event information 225 is published as messages on the sequential message queue 240. One or more message consumers 260 (e.g., executing on one or more host devices) consume one or more of the published messages on the sequential message queue 240.

Figure 3:
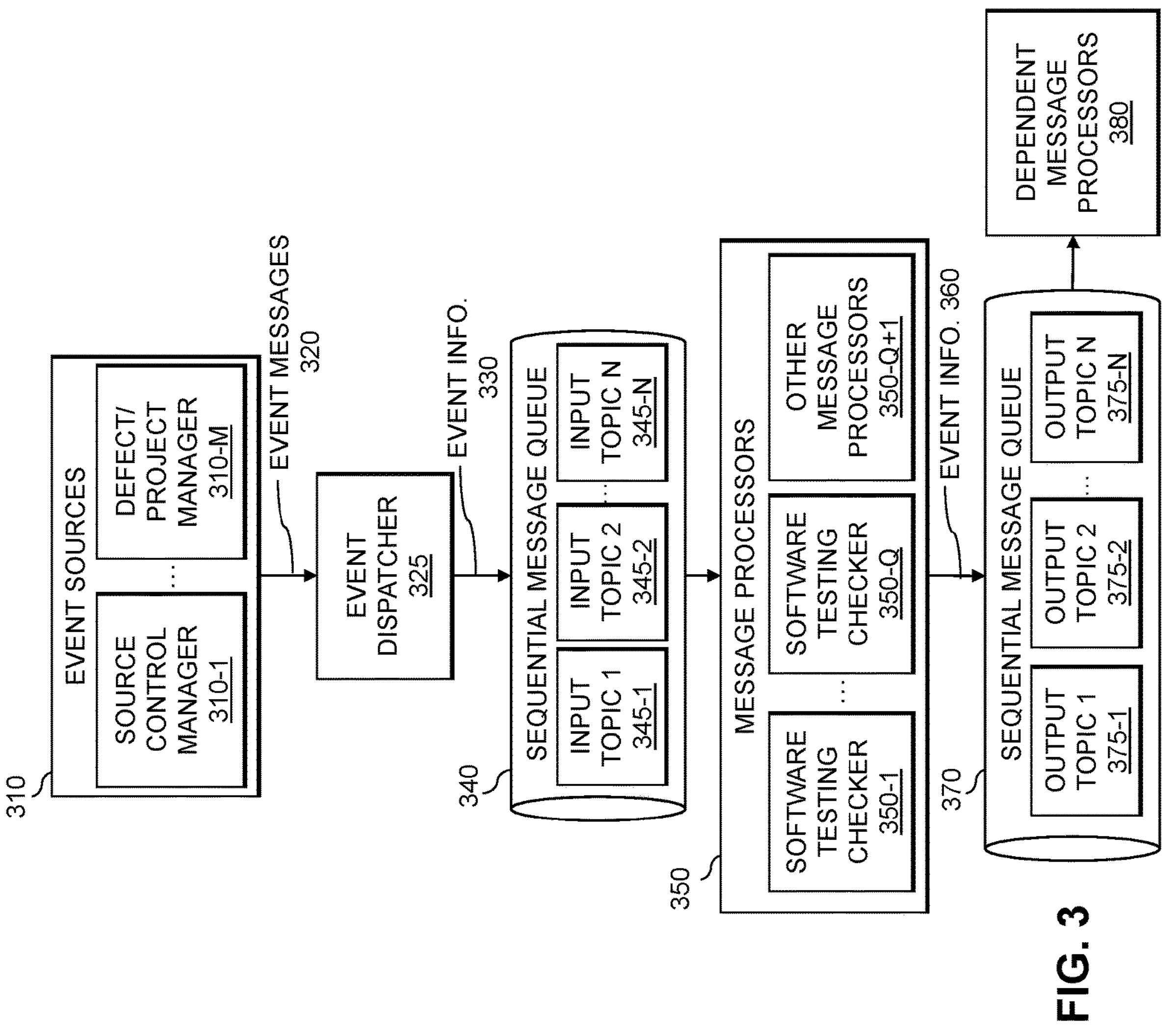
FIG. 3 illustrates a cascading of event information on a sequential message queue using input topics and output topics in an illustrative embodiment.

FIG. 3 illustrates a cascading of event information on a sequential message queue using input topics and output topics in an illustrative embodiment. In the example of FIG. 3, one or more event sources 310 (e.g., executing on one or more host devices) provide one or more event messages 320 to an event dispatcher 325 (for example, using an application webhook interface) in response to an occurrence of corresponding events associated with the event sources 310. In the FIG. 3 example, the one or more event sources 310 may comprise, for example, a source control manager 310-1 and a defect/project manager 310-M.

The event dispatcher 325 may publish the event information 330 from one or more of the event messages 320 to one or more input topics 345-1 through 345-N, collectively referred to herein as input topics 345, associated with a sequential message queue 340. For example, the event dispatcher 325 may provide the event information 330 to the sequential message queue 340, such as the sequential message queue 105 of FIG. 1, where the event information 330 is published as messages on the sequential message queue 340. One or more message processors 350 (e.g., executing on one or more host devices) consume one or more of the published messages from the input topics 345 on the sequential message queue 340.

In the example of FIG. 3, the message processors 350 comprise a plurality of software testing checkers 350-1 through 350-Q and zero or more other message processors 350-Q+1.

In addition, one or more of the message processors 350 publish event information 360 as one or more additional messages to one or more output topics 375-1 through 375-N, collectively referred to herein as output topics 375, associated with a sequential message queue 370. The sequential message queue 340 and the sequential message queue 370 may be implemented as the same message queue in at least some embodiments with different topics (e.g., input topics 345 on the sequential message queue 340 and output topics 375 on the sequential message queue 370).

In the FIG. 3 example, one or more dependent message processors 380 (e.g., executing on one or more host devices) consume one or more of the published messages from the output topics 375 on the sequential message queue 370. The one or more dependent message processors 380 may, in turn, publish event information as one or more additional messages to one or more topics.

In this manner, a cascading of event information 330, 360 occurs among message processors 350, 380, and may result in a cascading stream of actions by such message processors 350, 380. The message processors 350, 380 may consume messages from and/or publish messages to one or more sequential message queues.

Figure 4:
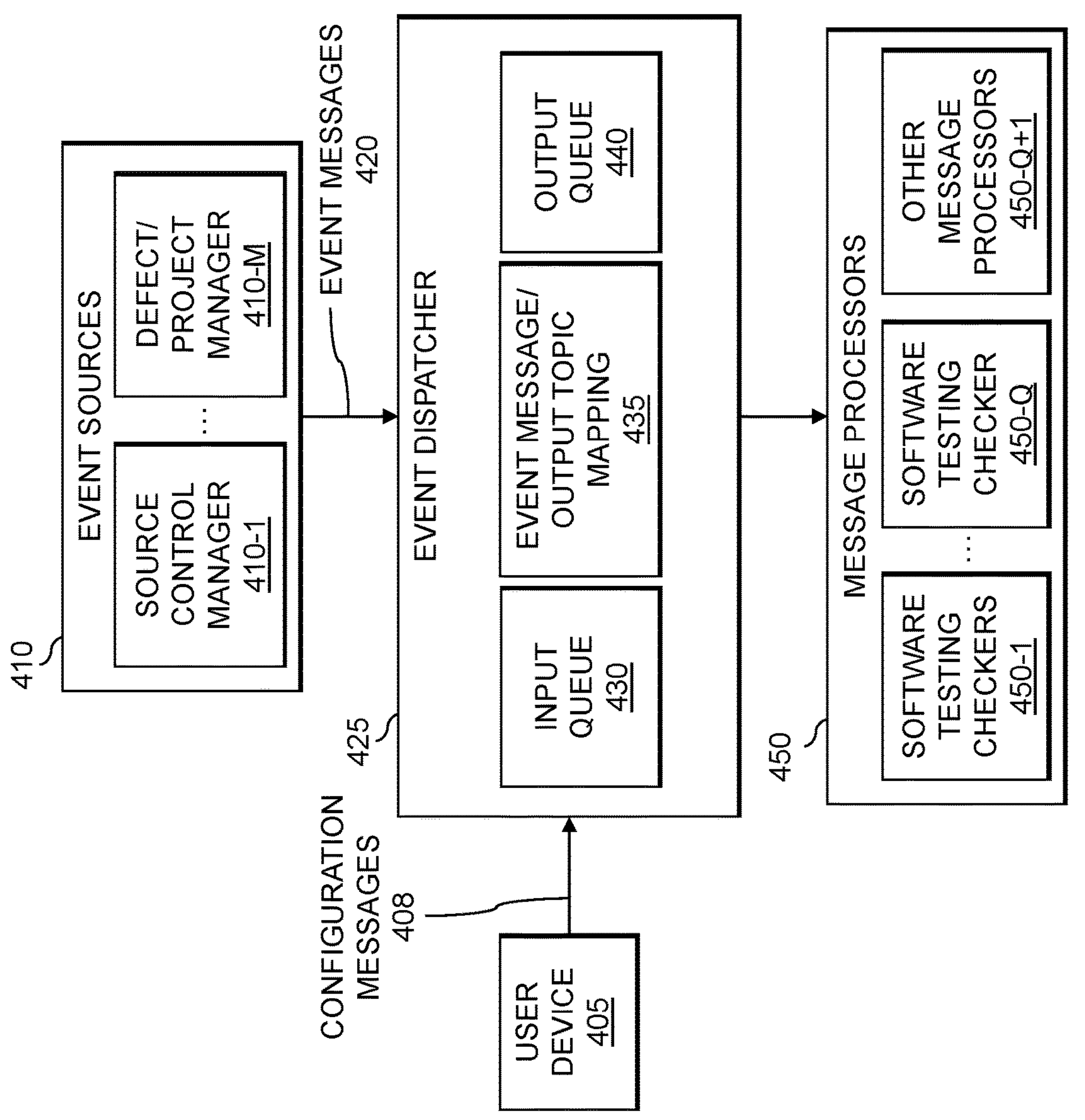
FIG. 4 illustrates a configuration of software testing checkers by an event dispatcher in an illustrative embodiment.

FIG. 4 illustrates a configuration of software testing checkers by an event dispatcher in an illustrative embodiment. In the example of FIG. 4, a user of a user device 405 provides one or more configuration messages 408 to an event dispatcher 425. The configuration messages 408 may be generated, for example, following a user selection of software testing checkers from a set of available software testing checkers (and/or an update of a previously selected set of software testing checkers), for example, using a graphical user interface, as discussed further below in conjunction with FIG. 5. In this manner, a user can choose and/or adjust a set of software testing checkers to apply to a given event, such as a software build event.

The user device 405 may comprise, for example, physical computing devices such as host devices, edge devices and/or other devices such as mobile telephones, laptop computers, tablet computers, desktop computers, Internet of things (IoT) devices, or other types of computing devices. Such devices are examples of what are more generally referred to herein as "processing devices." Some of these processing devices are also generally referred to herein as "computers."

As shown in FIG. 4, the event dispatcher 425 comprises an input queue 430, an event message/output topic mapping 435 and an output queue 440. The event message/output topic mapping 435 comprises a mapping of incoming event information, such as event information 330, to one or more input topics, such as input topics 345, that such event information should be posted to.

The configuration messages 408 are published to the input queue 430, in response to the user making a configuration selection or an update of a prior configuration selection using the graphical user interface. The configuration messages 408 may comprise an indication of a selected set of software testing checkers (e.g., identifiers of the selected software testing checkers), and/or adjustments to the selected set of software testing checkers thereafter.

The event dispatcher 425 processes the configuration messages 408 and updates the event message/output topic mapping 435 based on the relevant software testing checkers that are specified in the configuration. The output queue 440 may be used by one or more downstream processes.

One or more event sources 410 (e.g., executing on one or more host devices) provide one or more event messages 420 to the event dispatcher 425 in response to an occurrence of corresponding events associated with the event sources 410. In some embodiments, one or more of the event messages 420 from at least some of the event sources 410 may be received by a producer (not shown in FIG. 4) that places the event messages 420 on a sequential message queue and the event dispatcher 425 obtains the event messages 420 by subscribing to topics, as described elsewhere herein. In the FIG. 4 example, the one or more event sources 410 may comprise, for example, a source control manager 410-1 and a defect/project manager 410-M.

The event dispatcher 425 processes the one or more event messages 420 (e.g., filtering the one or more event messages 420 based on event attributes) and posts the one or more event messages 420 to one or more input topics (not shown in FIG. 4), such as one or more of the input topics 345 on the sequential message queue 340 of FIG. 3, based on the event message/output topic mapping 435 maintained by the event dispatcher 425.

One or more message processors 450 (e.g., executing on one or more host devices) consume one or more published messages from the input topics on a sequential message queue (not shown in FIG. 4). In the example of FIG. 4, the message processors 450 comprise a plurality of software testing checkers 450-1 through 450-Q and zero or more other message processors 450-Q+1.

In addition, one or more of the message processors 450 may publish event information as one or more additional messages to one or more output topics (not shown in FIG. 4), such as the output topics 375 on the sequential message queue 370 of FIG. 3. In some embodiments, the message processors 450 subscribe to one or more input topics and publish to one or more output topics using a static configuration. One or more dependent message processors (not shown in FIG. 4) may consume one or more of the published messages from the output topics on the sequential message queue, in a similar manner described above in conjunction with FIG. 3. The one or more dependent message processors may, in turn, publish event information as one or more additional messages to one or more topics.

Figure 5:
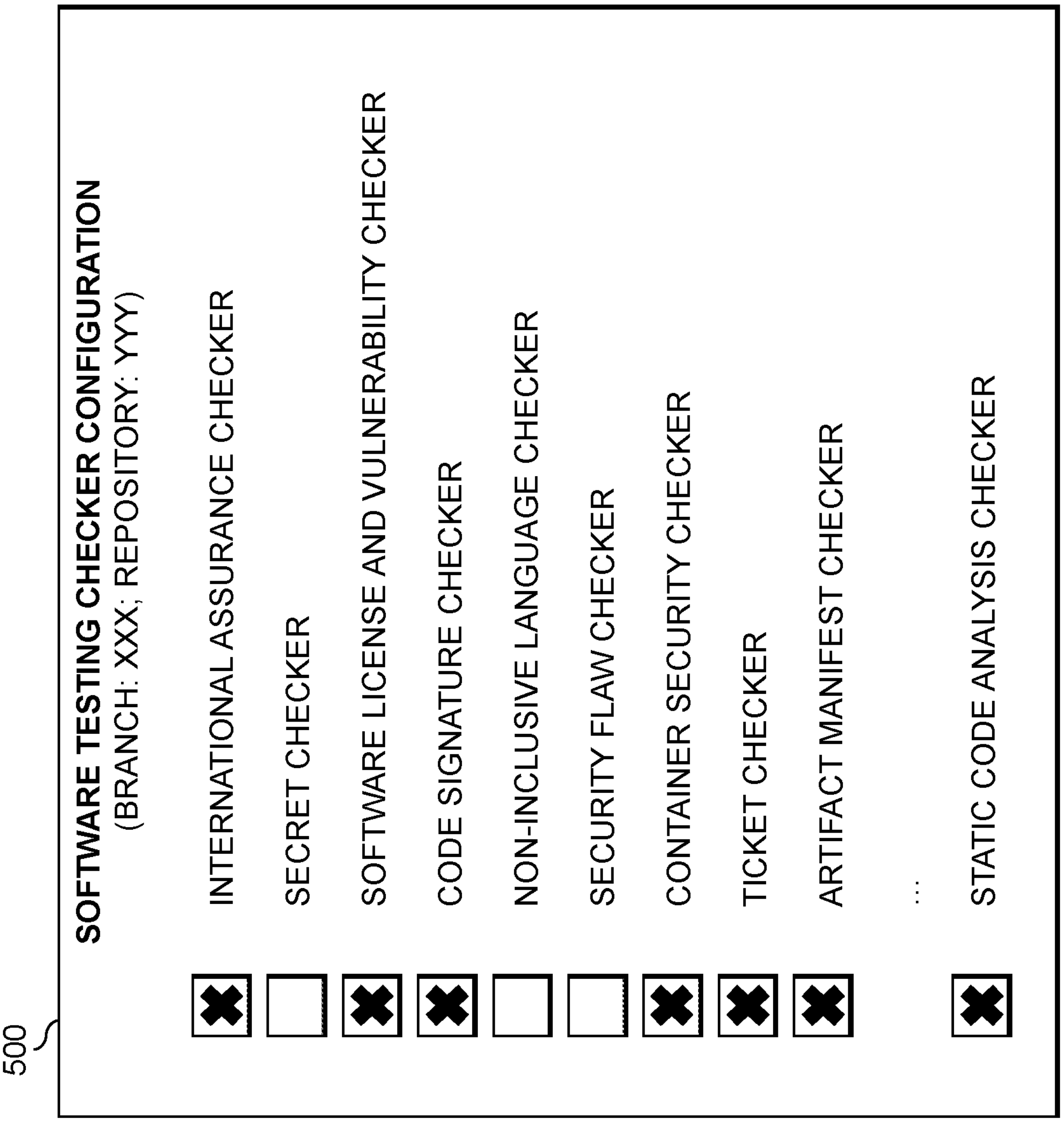
FIG. 5 illustrates a configuration of software testing checkers by selecting software testing checkers from a list of available software testing checkers in an illustrative embodiment.

FIG. 5 illustrates a configuration of software testing checkers by selecting software testing checkers from a list of available software testing checkers 500, for example, using a graphical user interface in an illustrative embodiment. The term "software testing checker" as used herein shall be broadly construed to encompass any software function or other event-driven entity that evaluates software, such as a static software scanner and/or a dynamic software scanner. The results from one or more software testing checkers may be evaluated in connection with a policy. Exemplary events associated with the software may comprise, for example, software push events, such as a software build request, a software pull request and/or a software deployment request, or other events that transition software from one stage to another (e.g., a software development stage to a software deployment stage).

In the example of FIG. 5, the software testing checkers are specified for a particular software branch and repository. The list of available software testing checkers 500 may comprise, for example, an international assurance checker, a secret checker, a software license and vulnerability checker, a code signature checker, a non-inclusive language checker, a security flaw checker, a container security checker, a ticket checker, an artifact manifest checker and a static code analysis checker. In some embodiments, a given software testing checker may be included in a particular configuration by marking (e.g., checking) an icon associated with the given software testing checker, as shown in the example of FIG. 5.

In one or more embodiments, the international assurance checker may evaluate a compliance of software with one or more international assurance guidelines. The secret checker may evaluate whether software comprises one or more software secrets (e.g., passwords or tokens). The software license and vulnerability checker may evaluate whether software has the necessary software licenses and/or whether the software comprises one or more known vulnerabilities, such as vulnerabilities identified in a national vulnerability database. The code signature checker may evaluate whether a software digital signature associated with software matches an expected value. The non-inclusive language checker may evaluate whether software complies with one or more inclusive language guidelines. The security flaw checker may evaluate whether the software comprises one or more known security flaws. The container security checker may perform container security testing to evaluate the virtual infrastructure used by the software. The ticket checker may evaluate whether the software has one or more required ticket references. The artifact manifest checker may ensure that an artifact management system is employed to maintain all deployed software code. The static code analysis checker may evaluate the software by examining the software code without executing the program.

Figure 6:
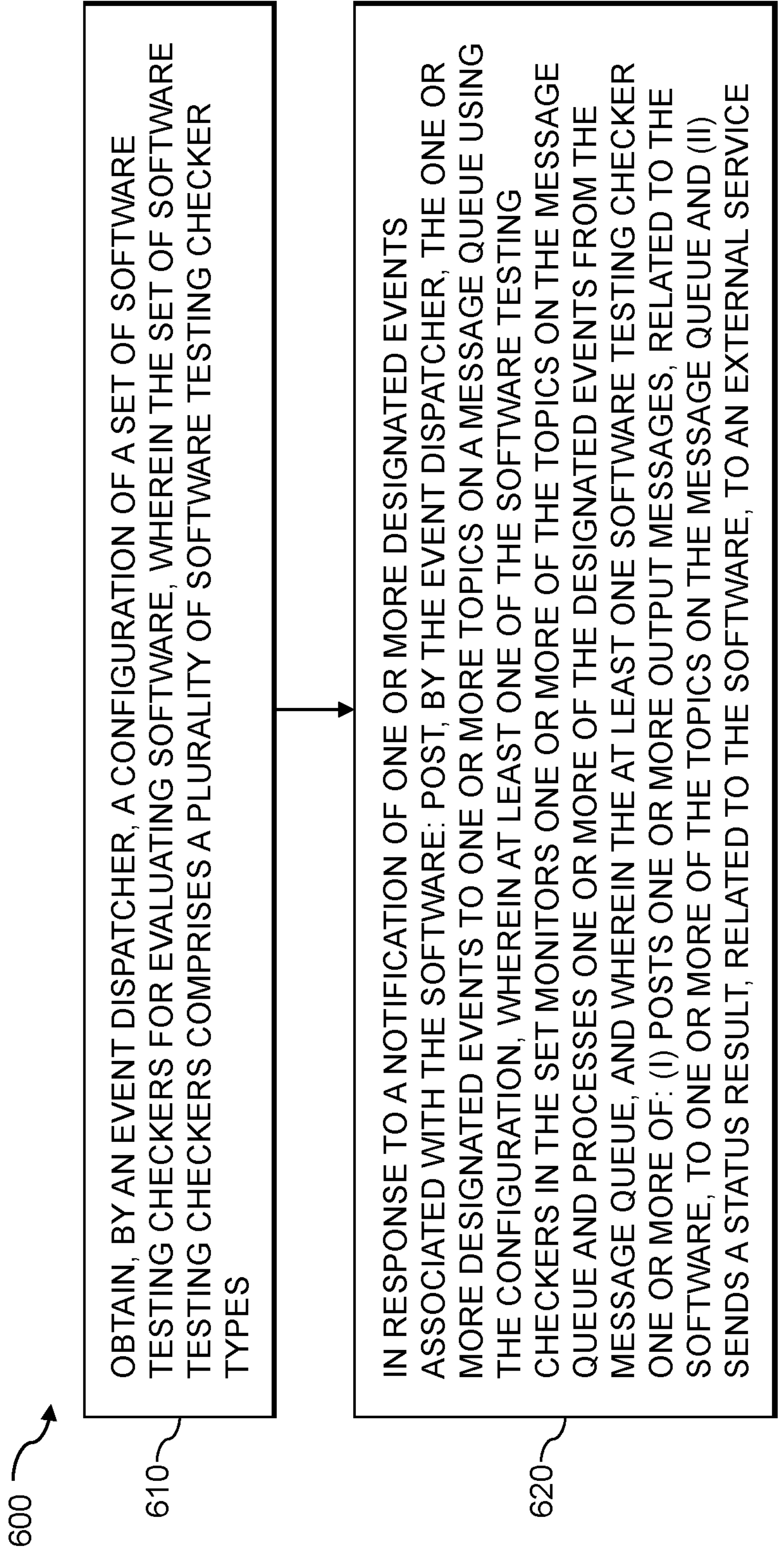
FIG. 6 is a flow chart illustrating an exemplary implementation of a process for management of software testing checkers using an event dispatcher in an illustrative embodiment.

FIG. 6 is a flow chart illustrating an exemplary implementation of a process 600 for management of software testing checkers using an event dispatcher in an illustrative embodiment. In the example of FIG. 6, an event dispatcher (e.g., at least one processing device associated with the event dispatcher) obtains a configuration of a set of software testing checkers for evaluating software in step 610, wherein the set of software testing checkers comprises a plurality of software testing checker types.

In step 620, in response to a notification of one or more designated events associated with the software: the event dispatcher posts the one or more designated events to one or more topics on a message queue using the configuration, wherein at least one of the software testing checkers in the set monitors one or more of the topics on the message queue and processes one or more of the designated events from the message queue, and wherein the at least one software testing checker one or more of: (i) posts one or more output messages, related to the software, to one or more of the topics on the message queue and (ii) sends a status result, related to the software, to an external service.

In some embodiments, the event dispatcher receives one or more configuration messages and updates the configuration based at least in part on a content of the one or more configuration messages. The configuration may be specified for at least one of: one or more branches of the software and one or more repositories associated with the software. The configuration of the set of software testing checkers for evaluating the software may be specified, for example, by selecting from a listing of designated software testing checkers (e.g., available software testing checkers). The one or more designated events associated with the software may comprise events related to one or more of a software build request, a software pull request, a software deployment request or other events related to a software push, for example.

In one or more embodiments, the software comprises a plurality of software delivery types. The plurality of software delivery types may comprise two or more of on-premises software, off-premises software (e.g., cloud and/or mobile implementations) and embedded software within one or more hardware devices. Among other benefits, a same configuration of the set of software testing checkers for evaluating the software may be specified for the plurality of software delivery types. Thus, the same mechanism may be employed to deliver the plurality of software delivery types. In this manner, the disclosed event-based software testing checker management techniques ensure that a given software product is delivered in a consistent way, prepared for customer consumption.

The particular processing operations and other network functionality described in conjunction with FIGS. 2 through 4 and 6, for example, are presented by way of illustrative example only, and should not be construed as limiting the scope of the disclosure in any way. Alternative embodiments can use other types of processing operations for management of software testing checkers using an event dispatcher. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for management of software testing checkers using an event dispatcher can be employed, for example, to process (i) configuration messages that specify a set of software testing checkers to maintain a mapping of incoming event information to relevant topics on a message queue, and (ii) event messages generated by event sources that are posted by the event dispatcher to topics on the message queue, based on the mapping, and are consumed from the message queue by one or more interested software testing checkers.

One or more embodiments of the disclosure provide improved methods, apparatus and computer program products for management of software testing checkers using an event dispatcher. The foregoing applications and associated embodiments should be considered as illustrative only, and numerous other embodiments can be configured using the techniques disclosed herein, in a wide variety of different applications.

It should also be understood that the disclosed event-based software testing checker management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for management of software testing checkers using an event dispatcher may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based event-based software testing checker management engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based event-based software testing checker management platform in illustrative embodiments. The cloud-based systems can include object stores.

In some embodiments, the cloud infrastructure additionally or alternatively comprises a plurality of containers implemented using container host devices. The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
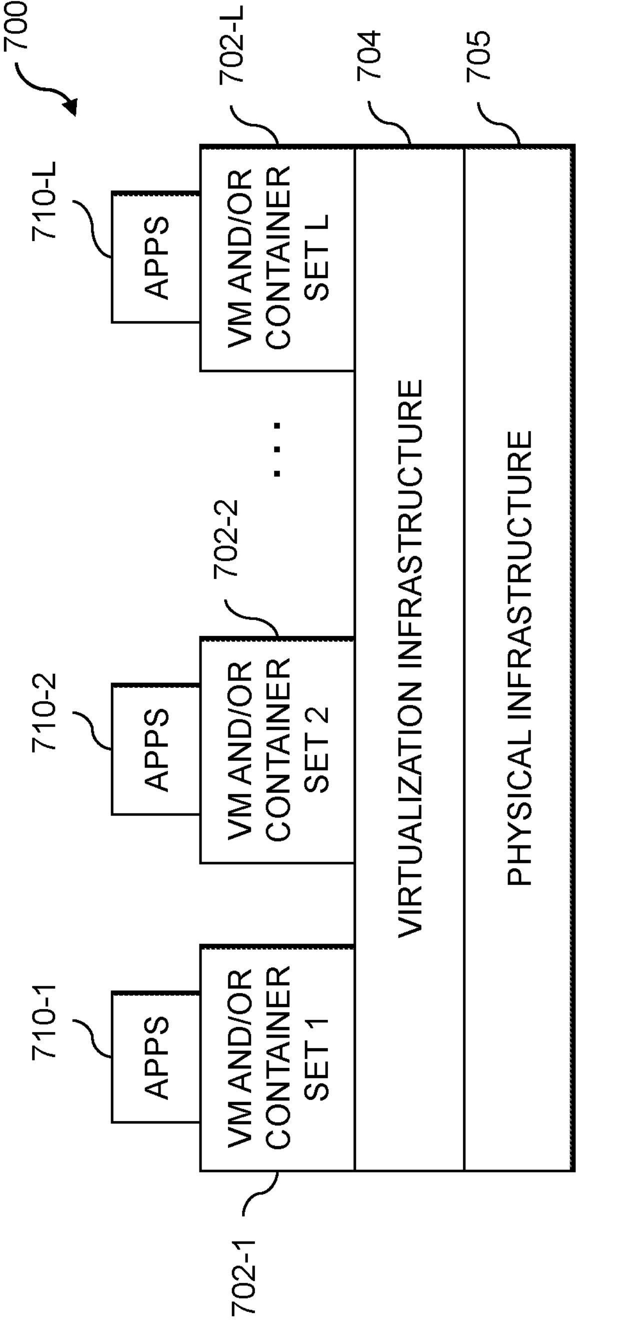
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2 . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2 . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide event-based software testing checker management functionality of the type described above for one or more processes running on a given one of the VMs. For example, each of the VMs can implement event-based software testing checker management control logic and associated publish/subscribe functionality for one or more processes running on that particular VM.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide event-based software testing checker management and mitigation functionality of the type described above for one or more processes running on different ones of the containers. For example, a container host device supporting multiple containers of one or more container sets can implement one or more instances of event-based software testing checker management control logic and associated publish/subscribe functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
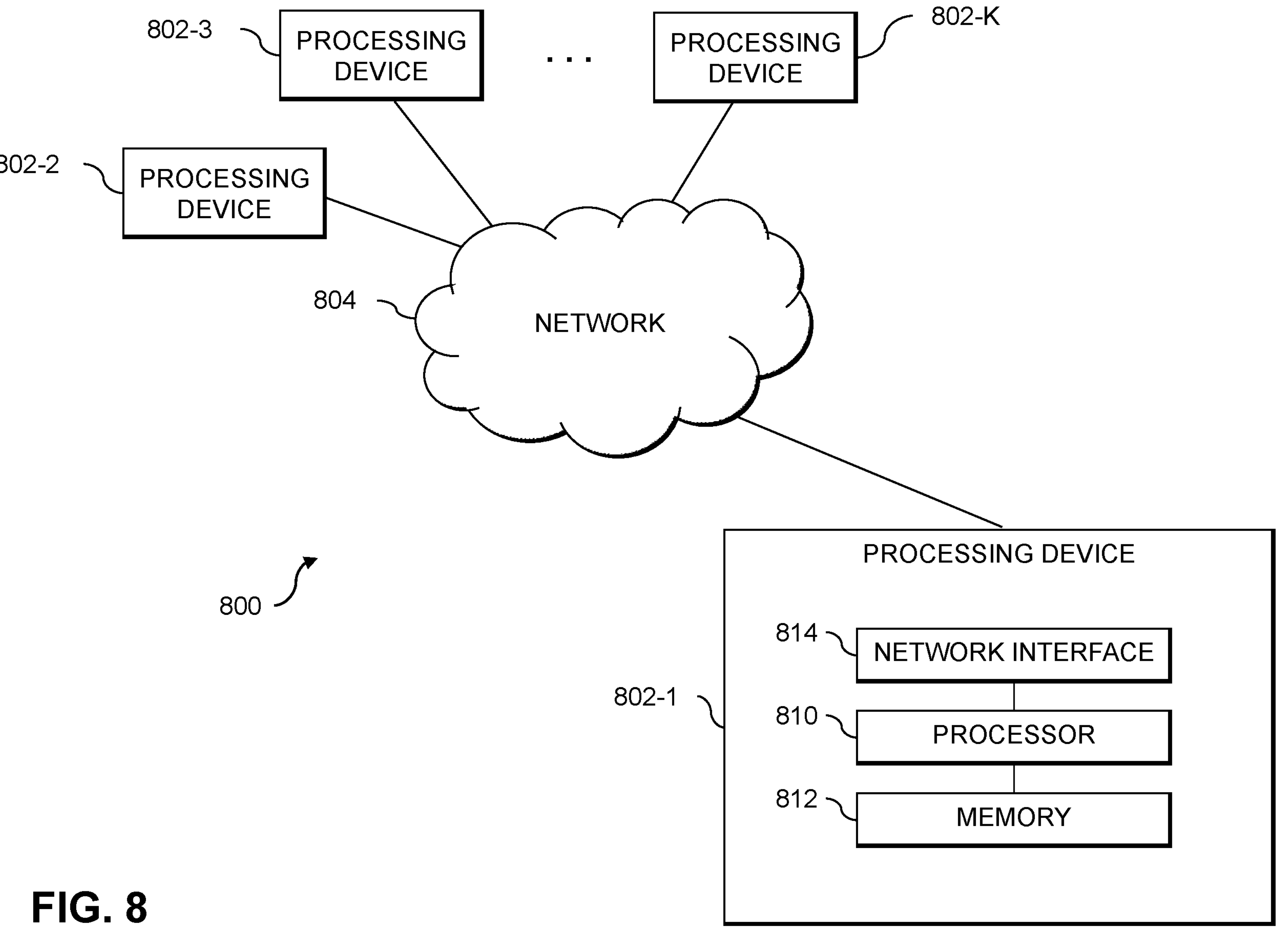
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by an event dispatcher, a configuration of a set of software testing checkers for evaluating software, wherein the set of software testing checkers comprises a plurality of software testing checker types; and in response to a notification of one or more designated events associated with the software being evaluated:

publishing, by the event dispatcher, the one or more designated events to one or more first topics, of a plurality of topics, on at least one message queue using the configuration, wherein messages are published to the at least one message queue with at least one of the first topics, wherein at least one of the software testing checkers in the set of software testing checkers subscribed to one or more of the first topics on the at least one message queue and processes one or more of the designated events, published to a topic subscribed to by the at least one software testing checker, from the at least one message queue, and wherein, in response to consuming the one or more of the designated events from the at least one message queue, published to the topic subscribed to by the at least one software testing checker, the at least one software testing checker publishes one or more output messages, related to the software being evaluated, to one or more second topics, of the plurality of topics, on the at least one message queue;

wherein the consuming and the publishing of the messages on the at least one message queue provide a stream of actions for use by one or more message processors; and wherein the method is performed by at least one processing device comprising a processor coupled to a memory.

2. The method of claim 1, further comprising receiving, by the event dispatcher, one or more configuration messages and updating the configuration based, at least in part, on a content of the one or more configuration messages.

3. The method of claim 1, wherein the one or more designated events associated with the software comprise events related to one or more of a software build request, a software pull request and a software deployment request.

4. The method of claim 1, wherein the software comprises a plurality of software delivery types.

5. The method of claim 4, wherein the plurality of software delivery types comprises two or more of on-premises software, off-premises software and embedded software within one or more hardware devices.

6. The method of claim 4, wherein a same configuration of the set of software testing checkers for evaluating the software is specified for the plurality of software delivery types.

7. The method of claim 1, wherein the configuration is specified for at least one of: one or more branches of the software and one or more repositories associated with the software.

8. The method of claim 1, wherein the configuration of the set of software testing checkers for evaluating the software is specified by selecting from a listing of designated software testing checkers.

9. An apparatus comprising:

at least one processing device comprising a processor coupled to a memory;

the at least one processing device being configured to implement the following steps:

obtaining, by an event dispatcher, a configuration of a set of software testing checkers for evaluating software, wherein the set of software testing checkers comprises a plurality of software testing checker types; and in response to a notification of one or more designated events associated with the software being evaluated:

publishing, by the event dispatcher, the one or more designated events to one or more first topics, of a plurality of topics, on at least one message queue using the configuration, wherein messages are published to the at least one message queue with at least one of the first topics, wherein at least one of the software testing checkers in the set of software testing checkers subscribed to one or more of the first topics on the at least one message queue and processes one or more of the designated events, published to a topic subscribed to by the at least one software testing checker, from the at least one message queue, and wherein, in response to consuming the one or more of the designated events from the at least one message queue, published to the topic subscribed to by the at least one software testing checker, the at least one software testing checker: (i) publishes one or more output messages, related to the software being evaluated, to one or more second topics, of the plurality of topics, on the at least one message queue;

wherein the consuming and the publishing of the messages on the at least one message queue provide a stream of actions for use by one or more message processors.

10. The apparatus of claim 9, further comprising receiving, by the event dispatcher, one or more configuration messages and updating the configuration based, at least in part, on a content of the one or more configuration messages.

11. The apparatus of claim 9, wherein the one or more designated events associated with the software comprise events related to one or more of a software build request, a software pull request and a software deployment request.

12. The apparatus of claim 9, wherein the software comprises a plurality of software delivery types, and wherein a same configuration of the set of software testing checkers for evaluating the software is specified for the plurality of software delivery types.

13. The apparatus of claim 9, wherein the configuration is specified for at least one of: one or more branches of the software and one or more repositories associated with the software.

14. The apparatus of claim 9, wherein the configuration of the set of software testing checkers for evaluating the software is specified by selecting from a listing of designated software testing checkers.

15. A non-transitory processor-readable storage medium having stored therein program code of one or more software programs, wherein the program code when executed by at least one processing device causes the at least one processing device to perform the following steps:

obtaining, by an event dispatcher, a configuration of a set of software testing checkers for evaluating software, wherein the set of software testing checkers comprises a plurality of software testing checker types; and in response to a notification of one or more designated events associated with the software being evaluated:

publishing, by the event dispatcher, the one or more designated events to one or more first topics, of a plurality of topics, on at least one message queue using the configuration, wherein messages are published to the at least one message queue with at least one of the first topics, wherein at least one of the software testing checkers in the set of software testing checkers subscribed to one or more of the first topics on the at least one message queue and processes one or more of the designated events, published to a topic subscribed to by the at least one software testing checker, from the at least one message queue, and wherein, in response to consuming the one or more of the designated events from the at least one message queue, published to the topic subscribed to by the at least one software testing checker, the at least one software testing checker: publishes one or more output messages, related to the software being evaluated, to one or more second topics, of the plurality of topics, on the at least one message queue;

wherein the consuming and the publishing of the messages on the at least one message queue provide a stream of actions for use by one or more message processors.

16. The non-transitory processor-readable storage medium of claim 15, further comprising receiving, by the event dispatcher, one or more configuration messages and updating the configuration based, at least in part, on a content of the one or more configuration messages.

17. The non-transitory processor-readable storage medium of claim 15, wherein the one or more designated events associated with the software comprise events related to one or more of a software build request, a software pull request and a software deployment request.

18. The non-transitory processor-readable storage medium of claim 15, wherein the software comprises a plurality of software delivery types, and wherein a same configuration of the set of software testing checkers for evaluating the software is specified for the plurality of software delivery types.

19. The non-transitory processor-readable storage medium of claim 15, wherein the configuration is specified for at least one of: one or more branches of the software and one or more repositories associated with the software.

20. The non-transitory processor-readable storage medium of claim 15, wherein the configuration of the set of software testing checkers for evaluating the software is specified by selecting from a listing of designated software testing checkers.

* * * * *